(12) United States Patent
Gross

(10) Patent No.: US 7,685,028 B2
(45) Date of Patent: Mar. 23, 2010

(54) METHOD OF TESTING INVENTORY MANAGEMENT/SHIPPING SYSTEMS

(76) Inventor: John N. Gross, 3883 18th St., San Francisco, CA (US) 94114

( * ) Notice: Subject to any disclaimer, the term of this patent is extended or adjusted under 35 U.S.C. 154(b) by 1668 days.

(21) Appl. No.: 10/857,761

(22) Filed: May 28, 2004

(65) Prior Publication Data

US 2004/0243570 A1 Dec. 2, 2004

Related U.S. Application Data

(60) Provisional application No. 60/473,994, filed on May 28, 2003.

(51) Int. Cl.
*Q06Q 10/00* (2006.01)
(52) U.S. Cl. .................... 705/28; 705/27; 715/740; 702/186; 702/188
(58) Field of Classification Search .............. None
See application file for complete search history.

(56) References Cited

U.S. PATENT DOCUMENTS

| | | |
|---|---|---|
| 5,095,195 A | 3/1992 | Harman et al. |
| 5,459,306 A | 10/1995 | Stein et al. |
| 5,664,110 A | 9/1997 | Green et al. |
| 5,699,526 A | 12/1997 | Siefert |
| 5,790,426 A | 8/1998 | Robinson |
| 5,842,199 A | 11/1998 | Miller et al. |
| 5,884,282 A | 3/1999 | Robinson |
| 5,918,014 A | 6/1999 | Robinson |
| 5,951,643 A | 9/1999 | Shelton et al. |
| 5,974,396 A | 10/1999 | Anderson et al. |
| 5,991,791 A | 11/1999 | Siefert |
| 6,006,225 A | 12/1999 | Bowman et al. |
| 6,012,052 A | 1/2000 | Altschuler et al. |
| 6,016,475 A | 1/2000 | Miller et al. |
| 6,026,403 A | 2/2000 | Siefert |
| 6,029,161 A | 2/2000 | Lang et al. |
| 6,041,311 A | 3/2000 | Chislenko et al. |
| 6,049,777 A | 4/2000 | Sheena et al. |
| 6,065,042 A | 5/2000 | Reimer |
| 6,067,562 A | 5/2000 | Goldman |
| 6,092,049 A | 7/2000 | Chislenko et al. |

(Continued)

FOREIGN PATENT DOCUMENTS

| | | |
|---|---|---|
| EP | 0900424 A1 | 10/1999 |
| WO | 0137539 A2 | 5/2001 |

OTHER PUBLICATIONS

Resnick, Paul; Varian, Hal R; "Recommender Systems", Mar. 1997, Communications of the ACM, vol. 40, No. 3, pp. 56-58.

(Continued)

*Primary Examiner*—F. Zeender
*Assistant Examiner*—Luna Champagne
(74) *Attorney, Agent, or Firm*—Law Office of J. Nicholas Gross, P.C.

(57) ABSTRACT

An inventory management, and a shipping/returns management system can be analyzed to determine various performance characteristics of an e-commerce operator, such as whether the latter maintains sufficient items to meet demand, whether distribution is occurring in a timely fashion, etc. The systems are analyzed using one or more anonymous proxy accounts.

20 Claims, 4 Drawing Sheets

U.S. PATENT DOCUMENTS

| | | | |
|---|---|---|---|
| 6,108,493 | A | 8/2000 | Miller et al. |
| 6,112,186 | A | 8/2000 | Bergh et al. |
| 6,169,997 | B1 | 1/2001 | Papierniak et al. |
| 6,236,985 | B1 | 5/2001 | Aggarwal |
| 6,253,203 | B1 | 6/2001 | O'Flaherty et al. |
| 6,286,139 | B1 | 9/2001 | Decinque |
| 6,308,168 | B1 | 10/2001 | Dovich et al. |
| 6,317,722 | B1 | 11/2001 | Jacobi et al. |
| 6,321,221 | B1 | 11/2001 | Bieganski |
| 6,334,127 | B1 | 12/2001 | Bieganski et al. |
| 6,389,372 | B1 | 5/2002 | Glance et al. |
| 6,412,012 | B1 | 6/2002 | Bieganski et al. |
| 6,480,855 | B1 | 11/2002 | Siefert |
| 6,484,123 | B2 | 11/2002 | Srivastava |
| 6,487,541 | B1 | 11/2002 | Aggarwal et al. |
| 6,496,816 | B1 | 12/2002 | Thiesson et al. |
| 6,502,096 | B1 | 12/2002 | Siefert |
| 6,584,450 | B1 * | 6/2003 | Hastings et al. ............... 705/26 |
| 6,606,619 | B2 | 8/2003 | Ortega et al. |
| 6,714,931 | B1 | 3/2004 | Papierniak et al. |
| 6,766,525 | B1 | 7/2004 | Lee et al. |
| 6,831,663 | B2 | 12/2004 | Chickering et al. |
| 6,853,982 | B2 | 2/2005 | Smith et al. |
| 6,904,408 | B1 | 6/2005 | McCarthy et al. |
| 6,963,850 | B1 | 11/2005 | Bezos et al. |
| 7,039,631 | B1 | 5/2006 | Finger, II |
| 7,107,227 | B1 | 9/2006 | Bezos et al. |
| 7,107,238 | B2 | 9/2006 | Hatakama et al. |
| 7,110,954 | B2 * | 9/2006 | Yung et al. ...................... 705/1 |
| 7,162,432 | B2 | 1/2007 | Mascarenhas |
| 7,216,085 | B1 | 5/2007 | Wertheimer et al. |
| 2001/0036271 | A1 | 11/2001 | Javed |
| 2002/0112249 | A1 | 8/2002 | Hendricks et al. |
| 2002/0154157 | A1 | 10/2002 | Sherr et al. |
| 2003/0005428 | A1 | 1/2003 | Roman |
| 2003/0088472 | A1 * | 5/2003 | Offutt et al. ................... 705/22 |
| 2003/0093338 | A1 | 5/2003 | Kim et al. |
| 2003/0110104 | A1 * | 6/2003 | King et al. .................... 705/28 |
| 2004/0153389 | A1 | 8/2004 | Lortscher |
| 2005/0086127 | A1 | 4/2005 | Hastings et al. |

OTHER PUBLICATIONS

Ricci, Francesco et al; "Recommendation and Personalization in eCommerce," Proceedings of the AH'2002 Workshop on Recommendation and Personalization in eCommerce, Malaga, Spain, May 28, 2002, pp. 1-160.

Burke, Robin; "Hybrid Recommender Systems: Survey and Experiments," Sep. 24, 2001, User Modelling and User-adapted Interaction, 12: 331-370, 2002, Kluwer Academic Publishers.

Hastings, Reed et al., "Approach for Renting Content," U.S. Appl. No. 60/244,793, filed Oct. 31, 2000, 9 pages.

Ciancutti, John et al., "Approach for Choosing Items to Recommend Based Upon Matching Taste Across Multiple Users and Items," U.S. Appl. No. 60/212,193, filed Jun. 16, 2000, 15 pages.

Dana, James D. et al., "Revenue Sharing and Vertical Control in the Video Rental Industry," Department of Management and Strategy, J. L. Kellogg Graduate School of Management, Evanston, IL 2001, 36 pgs.

Ostrum, Mary Anne, "With newer releases, Netflix users can anticipate a 'very long wait'," The Mercury News: http://www.siliconvalley.com/mld/siliconvalley/3614404.htm, posted Jul. 6, 2002, 2 pgs.

O'Brien, Jeffrey M., "The Netflix Effect," Wired Magazine, Issue 10.12 Dec. 2002, 5 pgs.

DVD Avenue webpage, http://www.dvdavenue.com/?AID=6246759&PID=1244714, Jan. 29, 2003, 2 pgs.

Qwikfliks webpage, http://www.qwikfliks.com/xgenesis.asp, Jan. 29, 2003, 2 pgs.

Qwikfliks webpage, http://www.qwikfliks.com/cookies_req.asp Jan. 29, 2003, 1 page.

E-Business Strategies, Inc., "Netflix: Transforming the DVD Rental Business," 2002, 10 pgs.

Dvd_rent_test@hotmail.com, "An Analysis of Netflix's DVD Allocation System," http://dvd-rent-test.dreamhost.com, Apr. 22, 2003, version 1.0, 8 pgs.

DVD Barn webpage, http://www.dvdbarn.com/index.dvd, Jan. 29, 2003, 2 pgs.

Declaration of Neil D. Hunt, dated Mar. 16, 2007, Los Gatos, California, 11 pages.

Final Office Action for U.S. Appl. No. 10/771,049 mailed Sep. 20, 2007, 25 pages.

Information Disclosure Statement filed for U.S. Appl. No. 10/771,049 on Jun. 7, 2007, 14 pages.

Kazuhiro, Kohara; "Selective-Learning Rate Approach for Stock Market Prediction by Simple Recurrent Neural Networks," 2003, Springer-Verlag Berlin Heidelberg, 7 pages.

* cited by examiner

METHOD OF TESTING INVENTORY MANAGEMENT/SHIPPING SYSTEMS

RELATED APPLICATION DATA

The present application claims the benefit under 35 U.S.C. 119(e) of the priority date of Provisional Application Ser. No. 60/473,994 filed May 28, 2003, which is hereby incorporated by reference.

FIELD OF THE INVENTION

The present invention relates to testing, evaluating and measuring performance of inventory management and shipping systems typically employed by e-commerce sites.

BACKGROUND

Recommender systems are well known in the art. In one example, such systems can make recommendations for movie titles to a subscriber. In other instances they can provide suggestions for book purchases, or even television program viewing. Such algorithms are commonplace in a number of Internet commerce environments, including at Amazon, CDNOW, and Netflix to name a few, as well as programming guide systems such as TiVO. While the details of such algorithms are often proprietary, the latter typically use a number of parameters for determining a user's movie "tastes" so to speak, including demographics, prior movie rentals, prior movie ratings, user navigation statistics, comparison with other users, etc.

Recommender systems are often implemented as collaborative filtering (CF) algorithms. Such algorithms purportedly are "content" neutral, in the sense that they provide recommendations to a user for an item based on his/her similarity to another user (or users), and not with regard to the characteristics of the item itself. CF algorithms nonetheless may not be entirely "neutral, and may include subtle unintended (or even intended) bias in their recommendations. In some cases they may not recommend items that are "new" because CF systems tend to lag in their learning capabilities.

From the perspective of a subscriber or a content provider, determining the existence and extent of bias in a particular recommender system may be important. For example, a movie studio, a book publisher, a television program source (i.e., different types of content provider) may want to determine if a particular content service provider is accurately presenting recommendations to the right demographics group.

A recent article by Kushmerick titled "Robustness Analyses of Instance-Based Colloborative Recommendation"— 13th European Conference of Machine Learning, 2002, incorporated by reference herein—makes mention of the fact that recommender systems can be potentially "attacked" by outsiders to artificially inflate or degrade ratings of items. This problem is treated as one of "noise" which can affect the reliability and reputation of recommender systems. A similar discussion is presented by Kushmerick et al. in another article entitled "Collaborative Recommendation: A Robustness Analysis"—ACM Transactions on Internet Technology, Special Issue of Machine Learning for the Internet—(publication date unknown), which disclosure is also incorporated by reference herein. Thus the problem of "noise" added to recommender system datasets is just beginning to be appreciated.

Notably, however, Kushmerick fails to consider the possibility of an internal "bias" which is intentionally introduced by the recommender system operator, or how to detect/measure the same. Such bias may be designed and built in by the recommender system operator based on a desire to alter—i.e., boost or reduce the marketability of certain items in exchange for some incentive from a third party. Since such bias is introduced by the operator, it is extremely challenging to detect from the outside. Nonetheless, the identification and measurement of such bias is clearly useful to outside parties to help gain an understanding of the relative fairness, reliability, reputation, etc. of recommender systems.

Furthermore, a content provider may want to test the adequacy and suitability of an inventory management and/or shipping system used by a particular service provider, to ensure that their stock of items is being adequately managed. From the perspective of a content provider, it is important to improve the efficiency of distributors who are effectively managing consumer demand for items by the content provider. One important parameter, for example, may be the issue of how quickly a recommender system for a particular vendor is able to assimilate and give recommendations on new items. The lack of data for new items is a known limitation of recommender systems, and yet the prior art does not describe any mechanism for comparing the performance of recommender systems in this respect.

In addition, the prior art does not consider how to determine whether a recommender system is complying with a particular preference policy which might be specified for recommendations. Such mechanism can afford a purchaser of such preference an opportunity to determine the performance of an online operator in achieving/satisfying a particular marketing/advertising criterion.

Finally, the prior art does not indicate how the effects of advertising can be correlated with recommender system behavior, or even how recommender system recommendations can be mined and exploited to improve online advertising campaigns. Accordingly, there is a present need for systems and methods for achieving such functions.

SUMMARY OF THE INVENTION

An object of the present invention, therefore, is to overcome the aforementioned limitations of the prior art.

Another object is to provide a method for testing, rating and reporting on a performance of a recommender system;

A related object is to provide a method for testing, rating and reporting on a performance of a recommender system concerning its ability to absorb new items and present meaningful recommendations for such materials;

A related object is to provide a method for analyzing recommendations made by a recommender system, for purposes of evaluating effects of advertising;

A further object is to provide a method for identifying whether a recommender system is accurately following a specified policy or preference;

Still another object is to provide a method for testing, rating and reporting on an inventory management performance of a content service provider;

Yet another object is to provide a method for testing, rating and reporting on a shipping/returns performance of a content service provider;

Another object is to deliver advertising to subscribers based on an analysis of recommender system behavior.

A first aspect of the invention, therefore, concerns a method of testing a recommender system.

A policy to be used in testing the recommender system is first established. Thereafter, a plurality of separate proxy accounts are set up at the online content service provider. The recommender system is then forced to interact with the plurality of separate proxy accounts to generate a plurality of separate recommendations for a plurality of corresponding items. A compliance level with the established policy can then be determined by examining the separate recommendations.

In a preferred embodiment, the policy includes at least one rule associating a particular subscriber profile with a particular item. The particular subscriber profile is also preferably defined by reference to a predetermined demographic profile which specifies at least an age and sex of a subscriber. Each particular item specified in the policy originates from a common content provider source. The policy can include flexible concepts, and can be associated with an expected or measured popularity of a particular item for a particular subscriber. In some instances, an intentionally biased policy can be used, which favors items originating from a particular content provider, so that the recommender system is tested to verify that it behaves with such bias.

To assist third party marketers/retailers, etc., additional policies can be automatically provided for testing a recommender system. Such additional policies can be based on evaluating a popularity of an item as determined from analyzing usage by online subscribers of text descriptors associated with the item. For example, a demand for a rental movie title can be determined by reference to a measurement of usage by online subscribers of text descriptors associated with the item during a period in which said movie title is in active release in public movie theatres. A growth in popularity of such movie title over time can also determine how to set a policy. Furthermore, in some instances, a third party can be given express permission, in exchange for consideration, to intentionally provide a policy of its choosing to bias a recommender system. This can be used, for example, to determine the effectiveness of a recommender system in providing marketing/sales opportunities to the third party.

Again in a preferred embodiment, the plurality of separate proxy accounts are set up with separate demographic profiles. Each recommendation made to a particular proxy account is logged. The recommendations are classified and compiled into at least two categories: (a) recommended items that satisfy the policy; (b) recommended items that do not satisfy the policy; in some instances they can also be compiled with reference to a third category: (c) recommended items that do not satisfy the policy but which originate from a predetermined content provider.

An informative report can be generated which identifies whether first content from a first content provider is recommended as frequently as second content from a second content provider. The report can also identify a list of most frequently recommended items to the separate proxy accounts; and/or a plurality of lists identifying the most frequently recommended items to each of the separate corresponding proxy accounts. Furthermore, the report can identify a degree of bias exhibited by the recommender system with respect to items originating from one or more particular content providers.

The item recommended can be a movie title, a book tile, a music tile, an article being auctioned, and/or a television program. In instances where the item includes newly released content, the recommender system can be tested to determine an extent of an awareness of such newly released content by the recommender system.

In other instances, a search engine can be tested using a similar methodology, to analyze for patterns of bias.

A second aspect of the invention concerns testing a service performance of an online content service provider. After identifying any bias, an inventory management system used by the online content service provider is analyzed to determine an existence and extent of supply deficiencies of inventory items. The testing steps are performed over a network by a client device without directly accessing a database of transaction records maintained by the online content provider at a separate server device.

In preferred embodiments an additional step of testing a shipping and returns management system used by the online content service provider is performed. This helps to determine delays and latencies associated with distributing inventory items to subscribers of the online content service provider, handling returns of old inventory items, and shipping new items as replacements for old inventory items. An availability of inventory items can also be determined, including whether an item is immediately available, or available only with a delay. As with the prior tester, a report can be generated and transmitted automatically to alert the online content provider to any bias and supply/logistical deficiencies.

A further aspect of the invention concerns a method of measuring behavior of a recommender system used for recommending items of interest to subscribers of an online content service provider. The method includes the steps of: setting up a target preference to be used by the recommender system; causing the recommender system to interact with at least one proxy account and so as to generate a plurality of separate recommendations for a plurality of corresponding items; verifying whether a preference exhibited by the recommender system is within the target preference by examining the separate recommendations.

In a preferred embodiment the target preference is identified as part of a contractual arrangement between the online content service provider and a content provider which provides items to the online content service provider for distribution. The target preference can be specified as an absolute number of recommendations, and/or a percentage of recommendations to be provided to subscribers. It can also be limited to a particular time period. For some applications, the preference is measured as part of an electronic audit of the performance of the online content service provider.

Still another aspect of the invention concerns a method of measuring effects of advertising on a recommender system used for recommending items of interest to subscribers of an online content service provider. The method includes generally the steps of (a) measuring awareness of an item by the recommender system; (b) presenting advertising associated with the item to subscribers of the online content provider; and repeating step (a) to determine a change in awareness by the recommender system in response to the activities of step (b).

A preferred approach measures the awareness by examining a frequency and/or probability that such item is recommended to a particular subscriber. In some applications steps (a) through (c) can be repeated for a second online content service provider, and a difference is compared between a change in awareness by the online content service provider recommender system and a second recommender system used by the second online content service provider. Further in some situations advertising can be adjusted for the second online content service provider and the online content service provider based on a learning rate for the item exhibited by their respective recommender systems.

Still another aspect of the invention concerns a method of delivering advertising to a subscribers of an online content service provider which uses a recommender for recommending items of interest to subscribers. The method generally comprising the steps of: (a) delivering advertising concerning a first item to the subscribers of the online content service provider; (b) measuring an awareness of a second item recommended by the recommender system to the subscribers of the online content service provider; (c) measuring an association exhibited by the recommender system between said first item and said second item, including a frequency and/or probability that the first item is also recommended to a subscriber when the first second item is recommended; (d) automatically adjusting the advertising delivered in step (a) associated with the first item to subscribers of the online content provider based on steps (b) and (c).

In some environments the online advertising is provided under control of an entity separate from the online content service provider. The advertising for the first item is reduced or eliminated in response to a determination that said second item and said first item are highly correlated.

It will be understood from the Detailed Description that the inventions can be implemented in a multitude of different embodiments. Furthermore, it will be readily appreciated by skilled artisans that such different embodiments will likely include only one or more of the aforementioned objects of the present inventions. Thus, the absence of one or more of such characteristics in any particular embodiment should not be construed as limiting the scope of the present inventions. While described in the context of a rental system, it will be apparent to those skilled in the art that the present teachings could be used in any Internet based rental or purchase system that employs a queue of some form.

DETAILED DESCRIPTION

Figure 4:
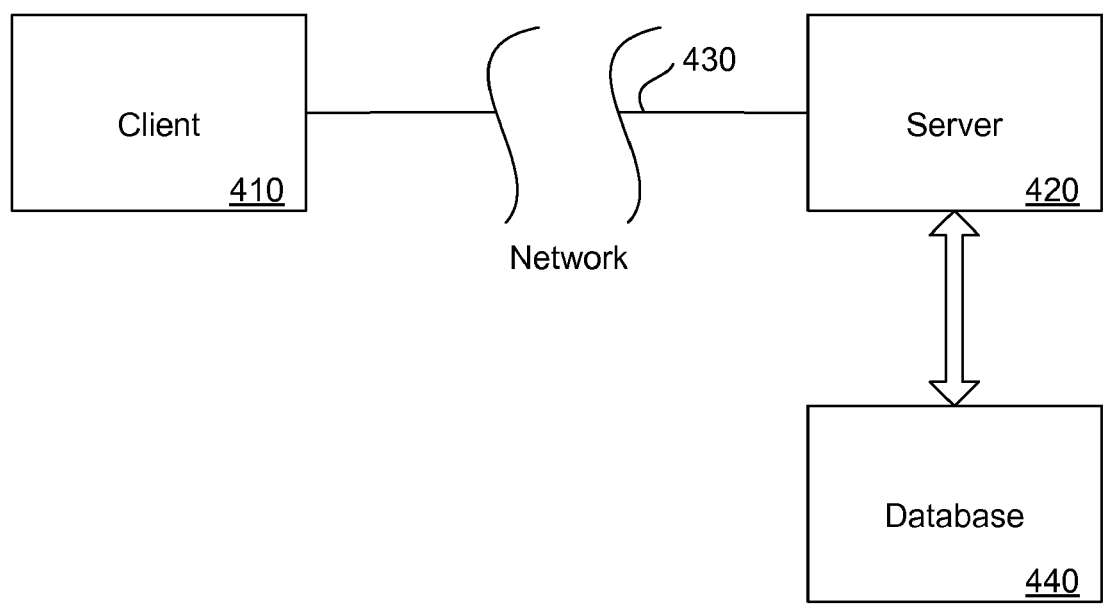
FIG. 4 is a diagram illustrating the basic components of a preferred system that performs the aforementioned shipping/returns monitoring process implemented in accordance with one exemplary embodiment of the present invention.

As noted above, a content provider may use the present process operating on a client device 410 which includes a browser (FIG. 4) to test, monitor and report on the performance of a content service provider, including a recommender system employed by the latter (operating on an Internet-accessible server 420 (FIG.4) connected by a network 430 to client device 410), to see if it is behaving in accordance with a particular policy, and/or if it is showing some measurable bias. A "recommender system" in this instance refers to a type of intelligent software agent which tailors a recommendation or suggestion for an item to a particular subscriber, based on characteristics of the subscriber, the item itself, or some combination thereof. In other words, a recommender system may incorporate some randomization features, but does not operate entirely based on a "random" presentation of content to a subscriber, or on a purely "programmed" presentation of content. Thus, a recommender system typically bases a particular recommendation to a particular subscriber based on explicit and implicit data obtained from such subscriber. The latter, of course, can include information gleaned from queries, web searches, surfing behavior, content selection, etc. In some instances, of course, a conventional search engine can be modified to behave like a recommender system in connection with certain types of searches.

A "content provider" in this instance refers generally to any entity that creates and/or supplies an inventory of items, such as books, movies, electronic programming. For example, a movie studio, a book publisher, a music publisher, and certain television stations are types of content provider.

A "content service provider" (or service provider) in this instance refers generally to an entity that is not directly involved in the creation of new content, but, rather, merely distributes it in some fashion as a service to subscribers.

These general definitions are intended merely as a simplification of course for understanding the present invention, and are not intended to be an exhaustive explanation of the kinds of entities/situations which are encompassed by the terms recommender system, content provider, or service provider.

As alluded to earlier, there are a number of reasons why a content provider would be interested in the performance of a content service provider, including an inventory management, shipping, and recommender system maintained by the latter. While the present description provides a few examples, a variety of other potential uses of the invention will be apparent to those skilled in the art.

In a first example concerning DVD rentals, the consideration paid by content service providers to content providers (at least in some cases) is a function of the number of distributions of the tiles to subscribers. For example, Netflix has a revenue sharing arrangement with a number of movie studios, in which the latter subsidizes the initial cost of inventory/titles in exchange for sharing part of the downstream revenue. Thus, in these instances, the content providers are financially coupled to a service provider's performance. Consequently, there is a need to ensure that the service provider, including a recommender system they may employ, is performing up to par and adequately marketing/promoting a particular content provider's materials. An automated monitoring system can also observe a number of service provider functions, such as inventory availability, inventory turn-around, as well as inventory recommendations. These are but examples, of course, and other service provider benchmarks could also be monitored and rated.

Thus content providers could also use such programs as described herein to detect and confirm that their inventory is being properly managed and fairly allocated by the service provider. Again distribution agreements between content providers and service providers typically call for some minimum availability performance, and if a service provider is not meeting demand, the content provider can be kept apprised of such fact.

Recommender Tester and Monitor

Figure 1:
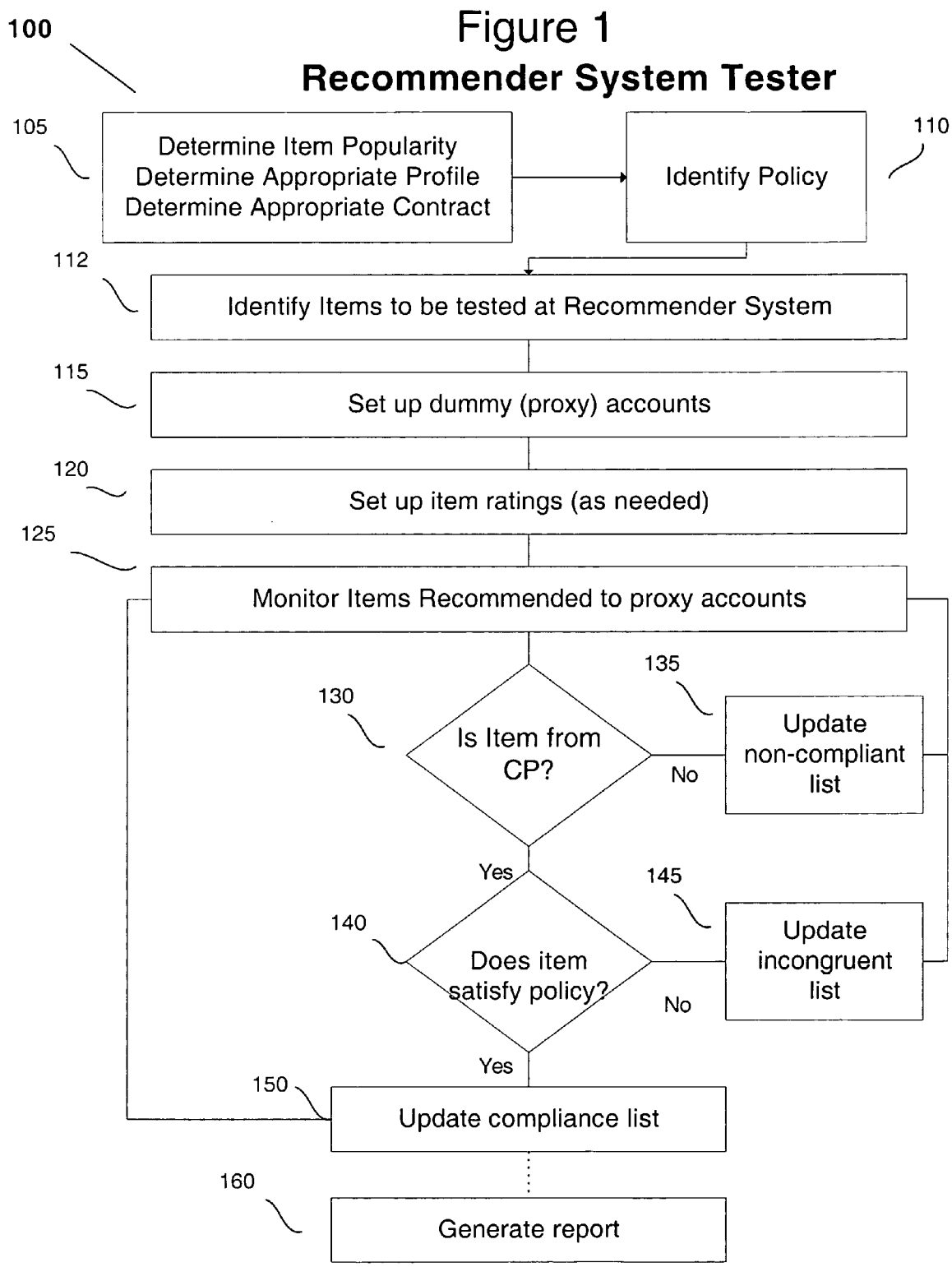
FIG. 1 is a flow chart illustrating the steps performed by a recommender tester process implemented in accordance with one exemplary embodiment of the present invention.

In a first aspect of the invention, a content provider can test, measure and verify the performance of a particular recommender system, using the recommender testing process illustrated in FIG. 1. To do this, a content provider sets up multiple accounts with different profiles, for the purpose of confirming/verifying that the service provider is accurately targeting inventory tiles to an appropriate audience, and/or that the recommender system is behaving appropriately in accordance with terms specified in an agreement between the service provider and the content provider.

In the latter case, for example, an agreement may call for the service provider to provide certain target levels of preference to a content provider, ranging from a simple "best efforts" type of preference to an extreme case of "exclusive" type of preference. In the former case the service provider may be required, for example, merely to present the content provider's items on a "fair" basis compared to other content providers. In the latter case the service provider may be required to present only such content provider's items, at least during defined periods.

Of course, there can be other variations as well, and those skilled in the art will appreciate that a contract term may specify that a content provider should receive a certain degree of preference (specified as an overall percentage of recommendations, or as an overall percentage of recommendations within the first N presentations), during certain time periods, for certain types of content, for certain genres, and/or for certain subscriber profiles. Again, there are wide variety of preferences, and the ways in which they can be implemented, and the present invention is by no means limited to any particular variant.

Brief Review of Recommender Systems and Need for Monitoring

Before describing the present invention, however, it is useful to review general background information pertinent to recommender systems. As noted earlier, a number of online rental providers use a recommender system to refer tiles to subscribers. From a content provider's perspective, it is important that such recommender systems "push" the content provider's tiles to the appropriate audience, or in accordance with target preference terms specified in an agreement with the service provider.

It is important to note that the service provider recommender systems are typically programmed using one or more of a variety of artificial intelligence techniques, some of which are identified in U.S. Patent Publication 200210625A1 to Amazon, and which is incorporated by reference herein. The general notion is to identify items that may be of interest to users, by monitoring their online behavior, their past purchases/rentals, similarities to other users as analyzed by collaborative filtering, etc. Still others operate by making suggestions based on analyzing similarities between items selected by the user (so called content filter based systems).

Another characteristic of recommender systems is that they are typically adaptive, meaning that they alter their recommendations by learning from other inputs aside from the user, such as from other user selections, user ratings, and community-wide based statistical data gathering. In many cases, a recommender system is unbiased, meaning that it is essentially content-neutral, and does not discriminate in favor of one content provider (i.e. releases from one movie studio) over another. Consequently, some recommender systems can be characterized as having essentially a content-neutral policy.

While this aspect can be important to subscribers, from the perspective of a content provider, what is more important is that any recommender system accurately and adequately present items originating from such source to appropriate audiences. On the other hand, from the perspective of a particular content provider, however, such entity would prefer that a recommender system use an extremely biased policy in its favor, in order to maximize distribution (and/or sales) of its products through the service provider. This may occur, as noted above, if a content provider has a particular preference guaranteed by contract from a service provider.

It is apparent that these two dynamics oppose each other, but at this time, a content provider is unable to monitor performance of a recommender system, let alone effectuate a major policy change in a neutral recommender system maintained by a content service provider. Nevertheless a content provider should be permitted, at least on some level, to monitor and ensure that even a content-neutral policy is being accurately implemented by a recommender system, and that, at some level it is being treated fairly as compared to other content providers, and/or that a particular preference is being honored.

Under conventional contractual arrangements for licensing and selling content, a content provider is not given sufficient audit rights to determine whether a particular service provider (or other seller) is using a fair recommender system, or behaving in accordance with a defined preference. Thus, there is a need for the present invention whereby a content provider can identify and substantiate any actual bias or preference in a recommender engine, which can be used to provide feedback to a service provider. This allows for a type of electronic auditing tool to verify performance of an entity pursuant to a defined preference in an agreement with a third party.

Recommender System Testing

The first step of the recommender system testing process 100, therefore, is to identify a particular policy at step 110 which the content provider wishes to test against. The policy may be based, for example, on the content provider's own evaluation of what demographics are required to optimize its revenues through a service provider from a particular set of tiles. Alternatively (or in addition) it may be negotiated and agreed upon as a form of preference that is defined in specific technical terms in an agreement with the service provider.

In the first case, the policy can be determined by reference to a number of techniques. For instance, in the case of movie rental items, this can be done with conventional surveys, and/or polling of movie audiences. A number of patents/applications describe the use of various data mining techniques for the purpose of identifying current trends, popularity, awareness, etc., of certain concepts, people, companies, and even individual content items (i.e., such as a book or movie title). An example of this is illustrated in U.S. Pat. No. 6,493,703 which is hereby incorporated by reference. A similar concept is illustrated in U.S. Patent Publication No. 2003/0004781 to Mallon et al. in which a community "buzz" index is used to predict a popularity, for example, of a particular movie before it is released. This application is also hereby incorporated by reference. Alternatively, interested entities can specify keywords, for example, and measure the awareness of such concepts within a particular online group. This can be measured, for instance, by examining queries, postings, clicks, etc., made by Internet users at a particular site. The awareness factors are typically expressed in some type of percentage of users, etc. Again, for further details those skilled in the art should refer to such disclosures.

The aforementioned Mallon et al application makes mention of using the techniques therein for purposes of measuring the "buzz" associated with a movie before it is released, and then using such figures to predict the popularity of a movie (including expected box office receipts) after it is released. The present invention can make use of a variation of this principle, in which the "buzz" associated with a particular movie tile is measured not only before it is released within specific demographic groups, but also contemporaneous with its release, and for a period of time thereafter. This larger snapshot in time is more likely to reveal a more accurate indicator of the popularity of a particular tile with a particular demographics group. In this respect, Internet users are likely to have significantly different interests and behaviors than the average movie fan. This means that typical measures of expected movie popularity, such as box office receipts, may not be accurate indicators of online rentals of a particular tile.

Thus it is more desirable, in fact, to identify a sample population online that mirrors the tendencies of subscribers of an online rental service. By observing the characteristics of the former (again, using one of the techniques described in the aforementioned patents and applications) a content provider can predict more accurately both the popularity and demographic profile for a particular title. As an example, a movie studio may observe that there is significant awareness of a particular movie (and thus potential rentals) among young males in the age range of 18-21, as determined by studying particular Yahoo! Message boards, other common interest online communities, or some other survey measuring mechanism. Again, the measurement of such interest can be based over a longer time period than that described in the prior art. Moreover, instead of "predicting" the popularity of a title as described in the prior art reference to Mallon et al, the actual popularity can be determined in fact by measuring at a time contemporaneous with the movie's release. The change in popularity can also be identified, to see if a movie's pre-release buzz was translated into a similar actual buzz, and, if so, for what duration of time. Again this is more accurate than pure box office receipts in predicting rental demand, because the latter may be distorted. As an example, as between two movies achieving the same box office receipts in the same time period, a title (A) that enjoyed a lot success early on but which peaks early and declines rapidly is probably less likely to require or enjoy as much rental demand as a tile (B) that starts off slowly but which builds continuing increasing sales over time. In the former case, the initial high popularity may be attributed to extensive advertising that fails to support a bad movie, while in the latter case the later high popularity may be attributed to favorable word of mouth which is continually growing. In such cases a content provider is better served by allocating a greater number of inventory for tile B, even if the overall box office numbers are the same.

In any event, regardless of the source of the information, an expected popularity, an expected demographic base/target, and/or a specified preference pursuant to an agreement is derived at step 105. This proprietary intelligence is then specified as a policy to measure the performance of a service provider recommendation system.

This can be done with (or without) reference to a list of particular items provided at step 112. Based on the results, the content provider can make efforts to alert the service provider, and even try to supplement, coax, or tune the service provider recommendation system to conform to the policy.

To do this, a plurality of dummy (profiling) accounts are set up at a particular content site at step 115 with a plurality of different standard profiles, which are preferably based on a particular subscriber demographic. For each account, the content provider can specify a particular gender, age, income, domicile, etc. Again, preferably the profiling accounts are set up so that each account has a distinct profile, and such that there are a sufficient number of profiles to accurately measure responsiveness of a recommender system to a particular content provider's tiles. In other words, if a movie studio has identified 10 basic demographic profiles that it uses to measure interest in its content, then a corresponding number of accounts are also set up to see how they are treated by the service providers' recommender system.

At step 120 ratings for particular tiles might also be explicitly provided for each account to the recommender system. This may be optional depending on whether such data is required by the particular recommender system (not all of them require ratings) and/or whether the content provider already has sufficient preexisting information (from the profile alone) to supply such data.

As noted, the above account profile information can be based on the content provider's own data concerning which demographics groups it believes (or has determined through other survey data) are appropriate for particular tiles. Therefore, these accounts are set up based on a prediction by the content provider that they should elicit a particular recommendation from the service provider's system, regardless of the type of recommendation engine used, based on the identified policy.

These profiling accounts are used by the content provider to monitor an overall performance/compliance by the service provider with explicit contractual terms, and/or content provider specific marketing targeting characteristics for particular content. Accordingly, the identity of tiles recommended by the recommender system (regardless of whether the latter is based on collaborative filtering, content filtering, item relatedness, or some equivalent methodology) to a particular profile account is then observed at step 125. This step can be repeated, as necessary, to continue eliciting recommendations for the particular profile account, and the tiles presented can be catalogued.

At step 130 the invention determines whether the recommender system has recommended one of the content provider's tiles. If not, a non-compliant list is updated with the movie title at step 135 and the process returns to step 125 to solicit another recommendation, until there are no more recommendations.

The non-compliant list can be used by the content provider for marketing intelligence, and/or as a starting point for providing feedback to the service provider to alter/tune the recommendation system based on non-compliance with the identified policy. Again, in some instances, it is possible that a particular service provider will offer higher placement of recommendations to certain content providers based on an amount of consideration paid, and/or to comply with a contractually mandated preference.

Thus, in a manner akin to that used by such services as Overture and Google (for search engines) a service provider might have a pay for placement policy, and the present invention can be used by a content provider to monitor compliance with such arrangement. In situations where a recommender system is biased (either intentionally or unintentionally), therefore, the existence and extent of bias and/or contractual preference can thus be measured.

If the tile is one that is owned by the particular content provider, an additional check is made as well at step 135 to determine if this is a tile that corresponds to an item that the content provider also predicted and/or desired to be recommended to a particular subscriber within the requirements of the policy identified by the content provider. If not, an incongruence list is updated with the name of the title. This list can be used for follow-up with the service provider to understand the reason why the title was recommended, and, if necessary to fine-tune the recommender system.

If the tile is recommended, and it was predicted (or required) by the content provider also to be recommended, the item is logged at step 150 on a compliance list. Again, the process loops back so the content provider can repeat the process to see if additional titles owned by the content provider are recommended. An overall compliance list can then be generated to see a percentage or number of content provider titles that were actually recommended.

In the end, the content provider can generate a master report at step 160 which identifies how accurately a service provider recommender system is matching the expectations and/or wishes of the content provider as concerns identifying appropriate titles to one or more particular demographic groups. For example, a log could be presented with all of the titles presented on the non-compliant list, the incongruent list, and the compliant list.

An overall percentage of accurate hits can be obtained, so that, for example, one metric may measure whether what percentage of a set of applicable titles were indeed presented to a particular group. Thus, if 10 titles should be shown to a particular account (or demographics group) in accordance with a defined policy, and only 5 were actually presented, this could be represented as a 50% hit ratio.

Additional metrics to determine how "immediately" the recommender presented the tile could be presented as well. As an example, if the title was presented on the nth recommendation to a benchmark subscriber having a particular profile, or a part of a list of n items, this information could be logged as well.

Again, any preference which the content provider is supposed to receive can be measured, without regard to the form of the preference, and without having to rely on internal databases 440 (FIG. 4) or reports from the service provider. The latter may be unavailable, or, in some cases, inaccurate.

In some instances, however, a service provider may provide actual abridged logs of recommendations made to subscribers, from which data files the above information can also be mined without explicitly setting up proxy accounts. Again, the content provider may cooperate with the service provider to develop a set of data fields to be logged, and thus ensure that the data files contain sufficient demographic information so that an accurate tallying of the appropriateness of recommendations can be measured. The logs can be edited appropriately by the service provider to include only pertinent data relevant to measuring the recommendation accuracy and bias, and thus protect the privacy of individual members. For example demographic variables such as age, gender, domicile can be captured along with the context of the recommendation (i.e., specific query or page being viewed) the date/time, and the actual items recommended. Additional data on prior items selected by the subscriber could also be correlated to give a picture of the user's preferences.

The invention can also be executed at defined intervals to measure changes in the recommender system. Thus, a comparison on a week to week basis could be done to see if there are improvements or degradations in relevancy, and/or to see if the service provider has tuned the recommender system in accordance with the content provider's wishes. The changes in the recommender system could also be tracked over time in response to specific news stories, press releases, word of mouth, or other published events.

Finally, the above testing can be done on a number of recommender systems providing similar items, and the results posted online for the benefit of consumer education. For example, various sites which recommend books could be evaluated, based on a particular subscriber profile, to see what titles are recommended. A neutral recommender system recommendation could be identified as well as a reference or benchmark, based on either a completely neutral recommender engine, or a compilation of known statistics of preferences already exhibited by the demographic group. As an example, in the movie tile market, a website identified as GroupLens is considered to be a fairly accurate and neutral recommender of titles, absent of any bias. Observations of any "bias" detected in the recommendations of other sites (i.e., other movie recommenders operated by such entities as Netflix, Blockbuster, Walmart) could also be identified for the benefit of online users, so that they could more accurately determine sites which are not using some form of artificial bias. The above could take the form of a single web page, tabulated report on the perceived biases of particular websites. Other examples for other items will be apparent to those skilled in the art.

Advertising—Recommender System Correlations

In some instances the invention could be run in conjunction with an advertising campaign, to measure the change in recommender system behavior in response to advertising. This in turn could be used by advertisers to determine the types and extent which advertising can influence recommender system characteristics, to improve advertising efficiency. In some cases, for example, certain ads may work better with certain types of recommender systems, and this behavior can be captured and exploited, to better craft appropriate advertising that is more effective (in the sense of generating additional relevant recommender system recommendations, or measurable bias).

In other words, the present invention, unlike the aforementioned Mallon et al. system, can be used to measure the activity or "buzz" of a recommender system and its reaction to advertising, as opposed to the buzz of a particular group of individuals. This can be used to improve advertising delivery and campaigns in a more effective manner, since recommender systems have a significant influence on online consumption, and are essentially marketing complements to advertising.

For example, if ad#1 for item #1 is presented at both a first online service provider and a second online service provider, the invention can be used to see its effect on separate recommender systems at such sites. If a first recommender system demonstrates a significant recognition or awareness of item #1 (such as measured by actual number of recommendations to one or more subscribers, or by a percentage of recommendations within a set of N recommendations, and/or as a percentage relative to other items), but a second recommender system does not, an advertiser can then use such information to change or reduce usage of ad#1 at the second online server.

Similarly, an advertiser may execute the present invention and study the reports and compliant, non-compliant and incongruent lists across the various profile accounts to discovery, identify and exploit associations employed by the recommender system which are not publicly disclosed by a service provider. In other words, a first advertiser may note that their own item (A) is always (or extremely likely to be) recommended in connection with (as part of a list or immediately following) recommendation of item B to a subscriber at a particular service provider website. If item B is an offering from a competitor, and a second advertiser is paying for such placement (i.e., through a preference or some other mechanism), then the first advertiser can essentially piggyback on such advertising, and reduce their expenditures in advertising at the service provider website for item A. This is because, in this instance, the associational behavior of the recommender system, which automatically places item A with item B, can be exploited to help the first advertiser eliminate paying for the actual placement of item A. Stated another way, a recommender system can act as a type of proxy advertiser in some instances.

Other variations will be apparent to those skilled in the art. By studying a list of recommendations made to one or more accounts, an advertiser can also glean associational links between subscriber profiles and certain items, as well as item to item correlations. If an advertised item is already sufficiently linked to certain subscriber profiles, or other popular items, an advertiser can adjust an advertising activity to reflect such existing awareness within the recommender system. Similarly, if an item is not sufficiently linked and does not show up with an appropriate frequency, an advertiser can make note of such fact and bring it to the attention of the service provider for correction. To identify associations, the advertiser can also specifically "rate" certain benchmark items during step 120 so as to see what particular recommendations are elicited. In other words, an advertiser might rank item A very high on a proxy account, and then see which items are recommended to such proxy account based on such rating.

The advertiser can thus "learn" the behavior of a particular recommender system, and thus tailor advertising to a particular website so as to maximize an influence on a recommender system. Other examples will be apparent to those skilled in the art.

Since recommender systems are now proactively and aggressively making specific suggestions to online users, and such suggestions are often followed up on, an advertiser has a very keen interest in determining an effectiveness of an ad through measurements of a recommender system. The ad "effectiveness" could be measured at different times, as well, to determine a lag in a recommender system.

It should be noted, of course that the converse process could also be used by the service provider, to increase a number of relevant recommendations that are tied to specific advertisers. Thus, in the case noted above, a recommendation system may be programmed to automatically "bump" item A from a list under certain circumstances, such as if an advertiser has not actually paid for item A to be advertised, and/or if item B is also on such list.

The process can be repeated again for a different account, until the policy has been verified for each of the profiles if desired. The process might be employed only on certain dates or times, for example, corresponding to a preference period specified in an agreement with the online service provider. Other examples will be apparent to those skilled in the art.

Again all of the above reports could also be published online for public consumption, so that interested parties could observe and determine a performance of various service providers.

Alternatively, the data can be used as an analysis tool against a competitor to see a recommendation immediacy rating for the latter's items, and to detect any actual "bias" in the recommender system policy. For example, the content provider could identify the actual number and identity of titles from another content provider recommended to the same demographic profile accounts. Using their own metrics (as gleaned from their own research concerning the relative expected popularity of a particular tile, such as online buzz, surveys, polling, or even box office sales) the content provider can then determine if a title in their library is being treated similarly, better, or worse by a service provider recommender system compared to a comparable tile from another content provider.

The process could be used to sample some portion of the content provider's library as noted at step 120 to make the same comparison against a plurality of comparable titles, and/or from multiple content sources. A fairness treatment/parameter can thus be computed for individual titles (across one or more content providers) and/or in aggregate (across one or more content providers) to detect and measure any bias and/or preference in a recommender system.

For instance, a particular item (A) might be presented to 10 different accounts in 10 different priorities. A first subscriber may have item A recommended as the first item to be recommended. Another subscriber have item A recommended as the 5$^{th}$ item to be recommended. Item A could then be compared to other items presented to the different accounts, to measure its relative treatment, and a report of the same could be presented to the content provider.

Thus the present method can used to measure and determine an overall relative recommendation treatment afforded by a recommender system to one content provider over another. This can be broken down further by demographics group if necessary, by genre, or even by some number of titles. Other examples will be apparent to those skilled in the art.

A similar report can be generated on a per tile basis, i.e., to identify which demographic groups were presented with a particular tile, and if such presentation was appropriate. Furthermore, a composite list of titles recommended can be presented to help the content provider identify whether certain titles were omitted, and not recommended at all.

Further a report could be generated that simply identifies the top titles from the content provider that are actually recommended. This can be based on the number of times that they are presented to particular demographic group profile accounts, the immediacy in which they are presented, or some combination (perhaps weighted) of the same. The weightings can be designed in some appropriate fashion desired by the particular content provider. As above, again, a similar list can be compiled for competitors, to evaluate an overall recommendation performance across multiple demographics groups.

Again, if a title is NOT recommended when it should be, the content provider can make note of such fact, and compile a list of titles for each service provider, either as part of a non-compliance list, or as part of an incongruence list. By doing this for each service provider, an overall performance can be determined to see which one is doing the better job of pushing the content provider's titles. As between two separate service providers, the content provider will want to know which one which is most efficient at presenting the content provider's titles to the right audiences.

Furthermore, as alluded to earlier, the content provider can also use the non-compliance list and the incongruence lists to alert the service provider directly to perceived problems or deficiencies in the recommender system. The service provider, in turn, may then elect to update the recommender system to more accurately reflect the desired response for particular subscriber profiles.

It should be noted that in some instances, certain recommender systems, may not recommend certain titles, based on their availability. Thus, a subscriber will not be recommended any titles that are not immediately available, and this may skew the results in an undesirable manner. To accommodate this nonetheless, the content providers can eliminate any such titles from consideration. Thus, they can detect any titles that are not currently available, and eliminate them from the compliance lists if desired.

Identifying—Monitoring and Comparing Learning Rate of Recommender System

Nonetheless, it can be seen that the present invention has particular utility in measuring the "learning" state/ability of particular recommender systems. By specifying a particular set of new items at step 112 (i.e., articles that are probably not rated by a large number of subscribers) the invention can determine which recommenders systems are more adaptable and fast-learning. For example, a movie studio, book publisher or music publisher may want to measure how "educated" a particular recommender system is about a particular new release. CF systems are known to suffer from learning lags caused by the first rater problem. From the perspective of a content provider, they would prefer that their new releases be recommended as soon as possible. Content service providers have a similar interest, because if subscribers are not "suggested" an item at their site early on, the chances increase that they will see it (and thus buy or rent it) someplace else. Thus, the present invention affords an ability to see which systems are most capable of learning new material.

It will be apparent to those skilled in the art that a similar evaluation could be made to determine a recommender system's reaction to a change in a subscriber profile. That is, a similar deficiency or lag in learning in response to subscriber tastes is known to be associated with recommender systems. Thus, another evaluation which can be performed is to present a set of N different profiles to a series of recommender systems, and then monitor the recommendations made by each recommender. The N profiles are then altered in a predetermined fashion, such as, for example, providing a number of new ratings on a number of predetermined benchmark items. The behavior of the recommender systems is then observed again to see what the new set of recommendations is that is now presented based on the new N profiles. From the perspective of a content provider, they may develop a desired target policy/profile for recommendations that they prefer to see based on such new profile. This target set of recommendations can then be compared to the actual recommendations made by the disparate sites to see which ones most accurately "learn" or mirror the results desired by a particular content provider.

Another advantage of the present invention is that it is not necessary to rely solely on a recommender system's collection of ratings information from subscribers, which, in many instances, may be under-reporting or underestimating the popularity of a title with a particular demographic, either because of a lack of ratings (which such systems rely upon extensively but take time to correct) or an incorrect modeling. By measuring early on a recommender system's behavior towards a particular benchmark profile, a content provider can take preemptive action to make sure that titles are accurately presented to appropriate audiences of its choosing.

While the invention is presented in the context of a movie tile recommender system, it is apparent that the methods disclosed above could be used in connection with a variety of online commercial sales/rental sites which use recommendation engines. Thus, a book/music supplier to Amazon could use the present invention to determine an accuracy, fairness and new item learning capabilities of a recommender system used by that website. A television content programmer could use the invention to verify the recommendations made by comparable recommenders. Suppliers of inventory to an online auction system (such as eBay) could use the invention to measure a fairness of an auction system recommender system. Other examples will be apparent to those skilled in the art, and the invention is by no means limited to the embodiments discussed herein.

Inventory Monitoring

As an ancillary component to the recommender tester system 100, the content service provider is also analyzed to determine if they are maintaining an adequate amount of inventory. It will be apparent that the process described in FIG. 2 could be implemented as part of the recommender tester process above, or as part of a completely different program.

Thus, at step 210 of FIG. 1 a content provider could specify a list of titles to determine their overall availability. These titles, for example, could be media that originate from a particular studio or particular book/music publisher among other things.

At step 220, the availability of the titles is measured at the content service provider. In the instance of an online service provider (such as at Netflix, Amazon, etc.), steps 210 and 220 can be performed automatically using a proxy account and automated programming techniques that are well known in the art. Other examples will be apparent to skilled artisans.

At step 230, a report is generated concerning the overall availability of titles from a particular content provider (or meeting some other specified criteria). This can be used for several purposes. First, if a tile is continually identified as "long wait," (or out of stock) a content provider can notify the content service provider that they wish to supply additional titles to improve subscriber delivery figures. Since the content provider typically derives revenue from actual shipments to subscribers, it is preferable that there be a satisfactory supply of titles to maximize their shared revenues. Again, while some service providers may already perform a similar function as a means of determining perceived needs, they do not operate with a particular content provider's interest in mind. Thus, they may not measure or react to inventory deficiencies for a particular content provider. Nor can content providers obtain access in many instances to the proprietary inventory management systems used by content service providers. Accordingly, they have a need for a system such as described herein, to help them verify that a library of titles they are sharing with the content service provider are being properly managed, and/or generally to ensure that a content service provider is adequately stocked.

It will be understood by those skilled in the art that the above is merely an example of an inventory monitoring method and that countless variations on the above can be implemented in accordance with the present teachings. A number of other conventional steps that would be included in a commercial application have also been omitted to better emphasize the present teachings. For further details on the specifics of the operation of the Netflix system see U.S. Pat. No. 6,584,450 incorporated by reference herein.

Shipping/Returns Monitoring

Figure 3:
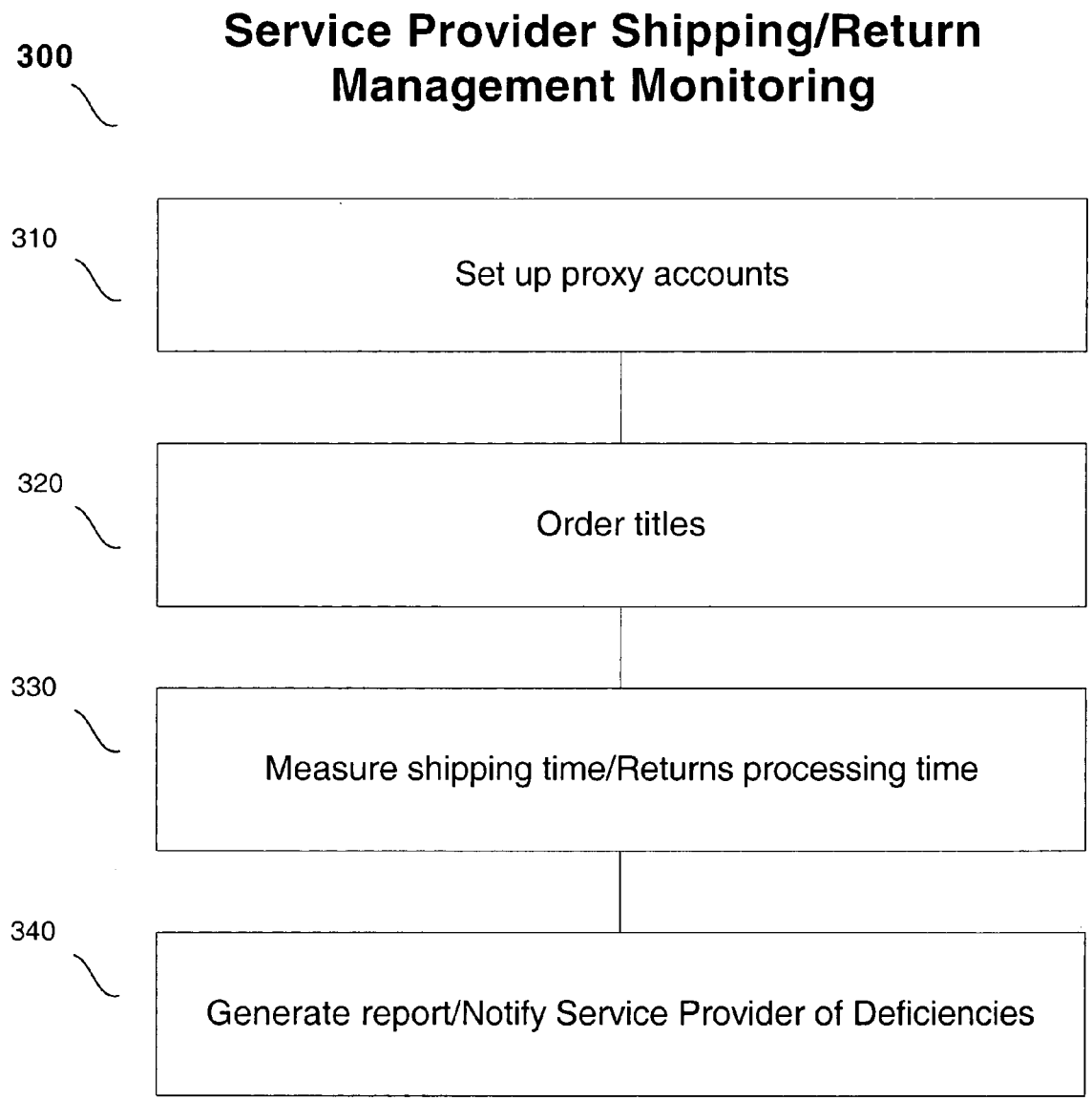
FIG. 3 is a flow chart illustrating the steps performed by a shipping/returns monitoring process implemented in accordance with one exemplary embodiment of the present invention.

As a further enhancement to the invention, again in the case of inventory, there are commercial arrangements (as in the case of Netflix above) whereby if content service providers do not turn around inventory fast enough, revenues are concomitantly reduced for the content providers as well. Accordingly, a shipping/returns monitoring system 300 can be implemented as shown in FIG. 3, either alone, or in combination with the recommender tester and inventory monitoring systems noted above.

To do this, multiple proxy accounts are set up at step 310 with each service provider, across different geographic regions, to gain better/more accurate shipping/receiving performance data for an individual provider. A list of items is ordered at step 320. The time required by the content service provider to actually ship is then measured at step 330, and an actual received time is also measured. In the case of an online rental system (such as Netflix, where a subscriber returns movies and is supposed to be shipped a new movie soon thereafter), the item is then returned, and the invention measures the overall processing time required for the content service provider to send out a new tile. Again, at step 340, an overall shipping and returns performance report is generated for the content provider. This could include such statistics as response times between orders and shipments, response times for shipments and receipts, turn-around times for returns, etc.

Again, since service providers are loathe to share their own proprietary turnaround data, the present invention affords a simple mechanism for content providers to observe the shipping/receiving performance of service providers using dummy, or proxy accounts. This data, in turn, can be used to reward and/or punish service providers who are performing well or poorly, or to negotiate new revenue sharing terms.

It will be understood by those skilled in the art that the above is merely an example of a shipping/returns performance method and that countless variations on the above can be implemented in accordance with the present teachings. A number of other conventional steps that would be included in a commercial application have been omitted, as well, to better emphasize the present teachings.

Figure 2:
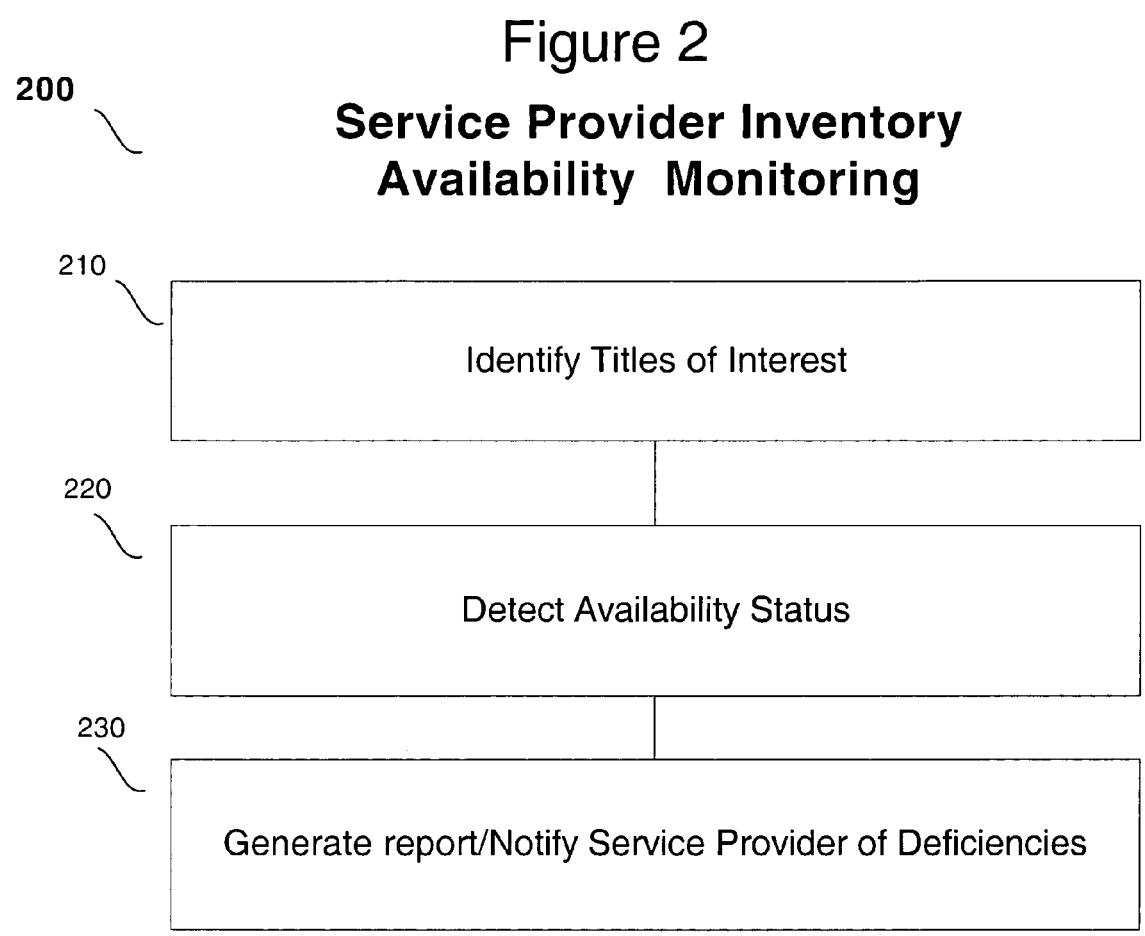
FIG. 2 is a flow chart illustrating the steps performed by an inventory monitoring process implemented in accordance with one exemplary embodiment of the present invention.

Finally, it will be apparent to those skilled in the art that the methods of the present invention, including those illustrated in FIGS. 1, 2 and 3 can be implemented using any one of many known programming languages suitable for creating applications that can run on client systems, and large scale computing systems, including servers connected to a network (such as the Internet). The details of the specific implementation of the present invention will vary depending on the programming language(s) used to embody the above principles, and are not material to an understanding of the present invention.

The above descriptions are intended as merely illustrative embodiments of the proposed inventions. It is understood that the protection afforded the present invention also comprehends and extends to embodiments different from those above, but which fall within the scope of the present claims.

What is claimed is:

1. A method of testing a service performance of an e-commerce site, the method comprising the steps of:
   (a) generating a request for an item from a client device through a client browser query to a server supporting the e-commerce site;
   (b) automatically determining an availability parameter accessible to subscribers for the item, including whether the item is presently available, or a predicted date for which the item will be available;
   (c) in response to detecting said availability parameter accessible to subscribers, automatically generating a notification from the client device to inform an operator of the e-commerce site when a deficiency of inventory is detected;
      wherein each of the above steps are performed over a network by a client device without directly accessing a database of transaction records maintained by and/or accessible only to the server for inventory or sales of such item.

2. The method of claim 1, further including a step: (d) testing a shipping and returns management system used by the e-commerce site using data accessible to a subscriber, to determine delays and latencies associated with distributing inventory items to subscribers of the online content service provider, handling returns of old inventory items, and shipping new items as replacements for said old inventory items.

3. The method of claim 1, further including a step: (d) identifying any selection bias introduced automatically by a recommender system and reporting the same automatically to the e-commerce site.

4. The method of claim 1, wherein multiple requests are made for the item to determine a maximum available inventory.

5. The method of claim 1, wherein said multiple requests made for the item are done at different times and by specifying different quantities of the item.

6. The method of claim 1, wherein said request for the item is generated automatically by a software agent on behalf of a proxy account.

7. The method of claim 1, further including a step: (d) generating a predicted demand for the item at the client device for a predetermined period.

8. The method of claim 7, further including a step: (e) comparing said predicted demand with an available supply for the item determined at the e-commerce site.

9. The method of claim 1, further including a step (d): comparing an item availability parameter against a target availability parameter, and generating a notification when said target availability parameter is not achieved.

10. The method of claim 9, wherein said target availability parameter specifies that at least a minimum number of said items must be available at any moment in time from the e-commerce site.

11. The method of claim 9, wherein said target availability parameter specifies a maximum time period during which an available number of items at the e-commerce site can be below a target minimum threshold number of items.

12. The method of claim 9, wherein said target availability parameter specifies an average number of items which must be available over a predetermined time period.

13. The method of claim 1, wherein said item is a movie title available from an online rental service.

14. The method of claim 13, wherein an availability of such item can be detected by automatically placing such item in a customer selection queue and without requiring that such item be actually shipped.

15. The method of claim 14, wherein the item is blocked from being actually shipped by automatically maintaining a number of items sufficient to meet a maximum customer out parameter for a proxy account.

16. A method of testing a service performance of an e-commerce site, the method comprising the steps of:
   (a) generating a request for an item from a client device through a client browser query to a server supporting the e-commerce site;
      wherein said request is automatically initiated on behalf of a proxy account representing a particular demographic profile for a user and not a an actual user;
   (b) automatically determining an availability parameter accessible to subscribers for the item for said proxy account, including whether the item is presently available, and/or a predicted date for which the item will be available;
   (c) in response to detecting said availability parameter accessible to subscribers, automatically generating a notification from the client device to inform an operator of the e-commerce site when a deficiency of inventory is detected;
      wherein each of the above steps are performed over a network by a client device without directly accessing a database of transaction records maintained by and/or accessible only to the server for inventory or sales of such item.

17. The method of claim 16 wherein said proxy account is automatically derived from analyzing behavior of persons in online forums.

18. The method of claim 16 further including a step: logging a recommendation made by a recommender system to said proxy account for one or more items to identify any bias automatically introduced by said recommender system.

19. The method of claim 16 further including a step: automatically issuing a report to an operator of the e-commerce site identifying a compliance level with a contractual arrangement for inventory management of such item.

20. The method of claim 16, further including a step: automatically repeating steps (a) to (c) for a list of items associated with a content provider of such items.

* * * * *